United States Patent
Nishiwaki

[11] Patent Number: 6,163,252
[45] Date of Patent: Dec. 19, 2000

[54] DEVICE FOR DETECTING OBSTACLES, FOR USE IN VEHICLES

[75] Inventor: Takeshi Nishiwaki, Tokyo, Japan

[73] Assignee: Mitsubishi Denki Kabushiki Kaisha, Tokyo, Japan

[21] Appl. No.: 09/406,802

[22] Filed: Sep. 28, 1999

[30] Foreign Application Priority Data

Apr. 7, 1999 [JP] Japan .................................. 11-100533

[51] Int. Cl.⁷ ..................................................... B60Q 1/00
[52] U.S. Cl. ............................................. 340/435; 342/70
[58] Field of Search .................................. 340/435, 436, 340/903, 904; 342/70

[56] References Cited

U.S. PATENT DOCUMENTS

| | | | |
|---|---|---|---|
| 4,103,278 | 7/1978 | Satake et al. | 367/107 |
| 5,710,565 | 1/1998 | Shirai et al. | 342/70 |
| 5,731,779 | 3/1998 | Kikuchi | 342/70 |
| 6,018,308 | 1/2000 | Shirai | 342/70 |
| 6,055,042 | 4/2000 | Sarangapani | 356/4.01 |

FOREIGN PATENT DOCUMENTS 1-254887 10/1989 Japan .
5-296777 11/1993 Japan .

*Primary Examiner*—Edward Lefkowitz
*Attorney, Agent, or Firm*—Sughrue, Mion, Zinn, Macpeak & Seas, PLLC

[57] ABSTRACT

A device for detecting obstacles, for use in vehicles, capable of correctly detecting obstacles without driving up the cost. the device includes a signal processing device 3 for detecting an obstacle Z based on reception signals A, B from a plurality of sensor devices 1, 2, wherein the signal processing device includes detection region-setting devices 31, 32 for dividing the region around the vehicle into a plurality of detection regions, probability-of-presence operation devices 33, 34 for operating the in-the-region presence probabilities P, Q of obstacle, a probability distribution operation device 35 for operating the in-the-region presence probabilities for each of the detection regions, and an obstacle detection device 36 for judging the regions S where the obstacles exist based on the in-the-region presence probabilities R in the distribution of presence probabilities, wherein the obstacle detection device judges detection regions exhibiting the in-the-region presence probabilities that are larger than a predetermined threshold value to be the regions where the obstacles exist among the in-the-region presence probabilities in the detection regions in the distribution of presence probabilities.

10 Claims, 19 Drawing Sheets

36B : OBSTACLE DETECTION MEANS

DEVICE FOR DETECTING OBSTACLES, FOR USE IN VEHICLES

BACKGROUND OF THE INVENTION

1. Field of the Invention

The present invention relates to a device for detecting obstacles around a vehicle by using reflection beams. More particularly, the invention relates to a device for detecting obstacles, for use in vehicles, which is capable of correctly detecting the positions and sizes of obstacles without driving up the cost.

2. Prior Art

Various devices have heretofore been proposed for detecting obstacles around a vehicle by using reflection beams as taught in, for example, Japanese Unexamined Patent Publications (Kokai) Nos. 296777/1993, 92263/1995 and 254887/1989.

According to Japanese Unexamined Patent Publication (Kokai) No. 296777/1993 which is concerned with a device for guiding a vehicle to a target position, a scanning-type laser distance sensor emits a laser beam in a predetermined direction and measures the time until the reception level of the reflection beam thereof exceeds a predetermined value, thereby to detect the distance to the obstacle.

When the laser beam is used as an emitted beam, however, it has been known that a reliable detection performance is not obtained though the resolution is high concerning the angular position of the obstacle.

For example, when the obstacle comprises a material that little reflects the laser beam, the reception level of the reflection beam may become smaller than a threshold value, and is not detected.

If the threshold value is lowered to enhance the detection performance, noise may be erroneously picked up. Thus, limitation is imposed on lowering the threshold value.

According to Japanese Unexamined Patent Publication (Kokai) No. 92263/1995 which is concerned with a device for detecting obstacles, for use in vehicles, on the other hand, an ultrasonic wave distance sensor emits ultrasonic waves and measures the time until the reception level of the reflection wave thereof exceeds a predetermined threshold value, thereby to detect the distance to the obstacle.

When the ultrasonic waves are used as an emitted beam, it has been known that the resolution is low concerning the directivity though the device can be relatively cheaply constituted and the distance to the obstacle can be highly reliably detected.

Even when the ultrasonic waves are used, the detection performance decreases when the obstacle comprises a material that little reflects ultrasonic waves.

As described above, the conventional devices for detecting obstacles, for use in vehicles have problems in that performance for detecting obstacles decreases when it is attempted to improve the resolution, and the detection performance is adversely affected by noise resulting in an erroneous detection when it is attempted to improve performance for detecting obstacles, no matter when ultrasonic waves, electromagnetic waves or laser beams are used.

SUMMARY OF THE INVENTION

The present invention was accomplished in order to solve the above-mentioned problems, and its object is to provide a device for detecting obstacles, for use in vehicles, which is capable of correctly detecting the positions and sizes of obstacles without driving up the cost.

A device for detecting obstacles, for use in vehicles according to the present invention comprises:

a plurality of sensor means for emitting beams toward the surrounding of the vehicle and for producing reception signals depending upon the intensities of the reflection beams; and a signal processing means for detecting obstacles around said vehicle based upon changes in the reception signals with the passage of time;

wherein said signal processing means includes:

detection region-setting means for dividing the region around said vehicle into a plurality of matrix-like detection regions;

probability-of-presence operation means for operating the probabilities of presence of said obstacles in said detection regions as in-the-region presence probabilities;

a probability distribution operation means for operating the distribution of presence probabilities by synthesizing said in-the-region presence probabilities for each of the detection regions; and an obstacle detection means for detecting the positions and sizes of said obstacles from said regions where said obstacles exist by judging the regions where said obstacles exist based on said distribution of presence probabilities;

wherein said obstacle detection means judges detection regions exhibiting the in-the-region presence probabilities that are larger than a predetermined threshold value to be the regions where said obstacles exist among the in-the-region presence probabilities in the detection regions in said distribution of presence probabilities.

The sensor means in a device for detecting obstacles, for use in vehicles according to the present invention, includes a first sensor means and a second sensor means that use ultrasonic waves as said beams, said first sensor means and said second sensor means being installed at different positions on the vehicle.

The sensor means in a device for detecting obstacles, for use in vehicles according to the present invention, includes a first sensor means that uses electromagnetic waves as said beam and a second sensor means that uses light as said beam.

The sensor means in a device for detecting obstacles, for use in vehicles according to the present invention, includes a first sensor means that uses ultrasonic waves as said beam and a second sensor means that uses light as said beam.

The obstacle detection means in a device for detecting obstacles, for use in vehicles according to the present invention, finds a maximum value in the in-the-region presence probabilities in each of the detection regions in said distribution of presence probabilities, and sets a value obtained by multiplying said maximum value by a correction coefficient as said threshold value.

The obstacle detection means in a device for detecting obstacles, for use in vehicles according to the present invention;

includes a filter processing means for effecting the filter processing for said in-the-region presence probabilities with the passage of time; and sets, as said in-the-region presence probability, a value obtained by adding up together:

a value obtained by multiplying a value Rk of the in-the-region presence probability of this time in each detection region Ek in the distribution of presence probabilities, by a first filter coefficient; and a value obtained by multiplying a value Rbj of the in-the-region presence probability of the previous time in each detection region Ej in the distribution of presence probabilities, by a second filter coefficient.

A device for detecting obstacles, for use in vehicles according to the present invention further comprises a vehicle speed sensor for detecting the speed of said vehicle, wherein the filter processing means in said obstacle detection means includes a previous value operation means for operating the previous value Rbj of the in-the-region presence probability corresponding to the value Rk of the in-the-region presence probability of this time depending upon the vehicle speed, and effects the filter processing with the passage of time by using said previous value Rbj.

The previous value operation means in a device for detecting obstacles, for use in vehicles according to the present invention, includes a correlation coefficient operation means for operating the correlation coefficient W (k, j) of the region Ej detected in the previous time corresponding to the region Ek detected this time for each of the detection regions depending upon the vehicle speed, and sets the sum of the values obtained by multiplying the in-the-region presence probabilities of the previous time related to all detection regions by said correlation coefficient W (k, j), as the previous value Rbj corresponding to the value Rk of this time.

A device for detecting obstacles, for use in vehicles according to the present invention further comprises a yaw rate sensor for detecting the yaw rate of the vehicle, the filter processing means in said obstacle detection means includes a previous value operation means for operating the previous value Rbj corresponding to the value Rk of said in-the-region presence probability of this time depending upon said yaw rate, and effects the filter processing with the passage of time by using said previous value Rbj.

The previous value operation means in a device for detecting obstacles, for use in vehicles according to the present invention, includes a correlation coefficient operation means for operating the correlation coefficient W (k, j) of the region Ej detected in the previous time corresponding to the region Ek detected this time for each of the detection regions depending upon the yaw rate, and sets the sum of the values obtained by multiplying the in-the-region presence probabilities of the previous time related to all detection regions by said correlation coefficient W (k, j), as the previous value Rbj corresponding to the value Rk of this time.

DESCRIPTION OF THE PREFERRED EMBODIMENTS

Embodiment 1.

An embodiment 1 of the present invention will now be described with reference to the drawings.

Figure 1:
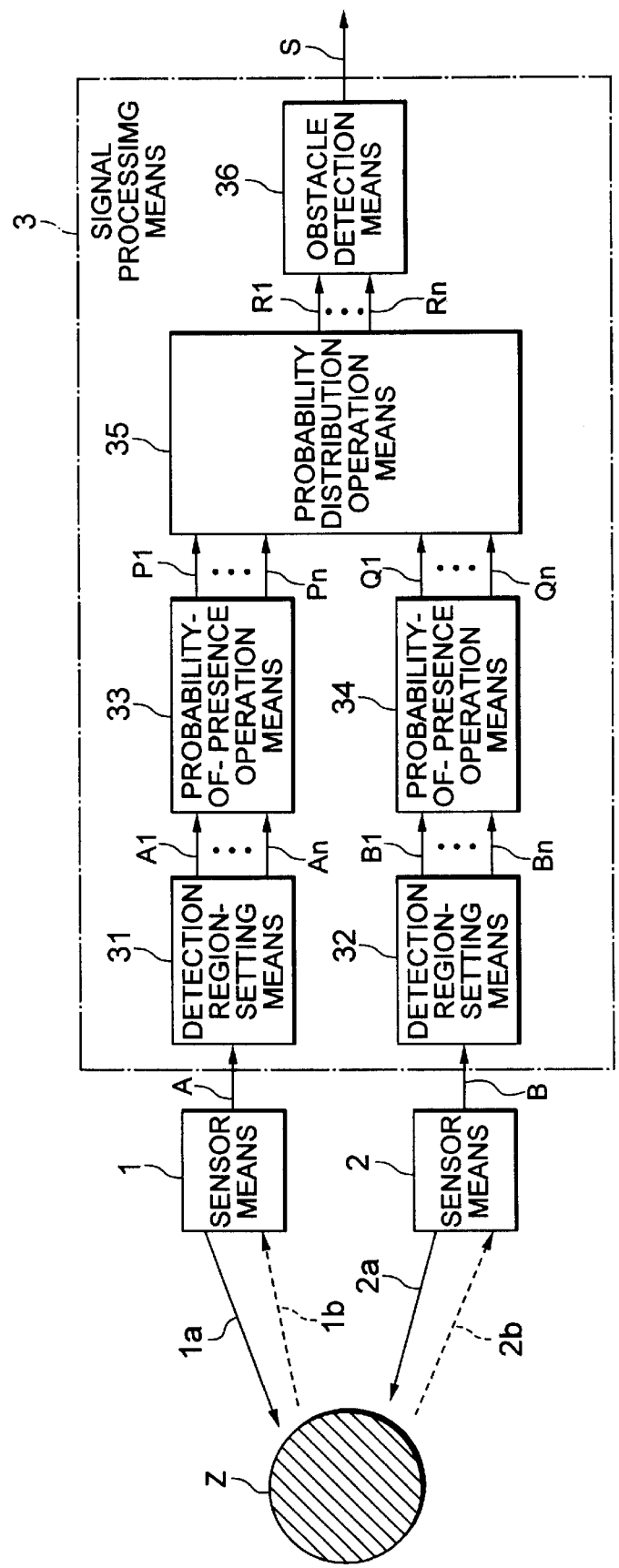
FIG. 1 is a block diagram illustrating an embodiment 1 of the present invention.
Figure 2:
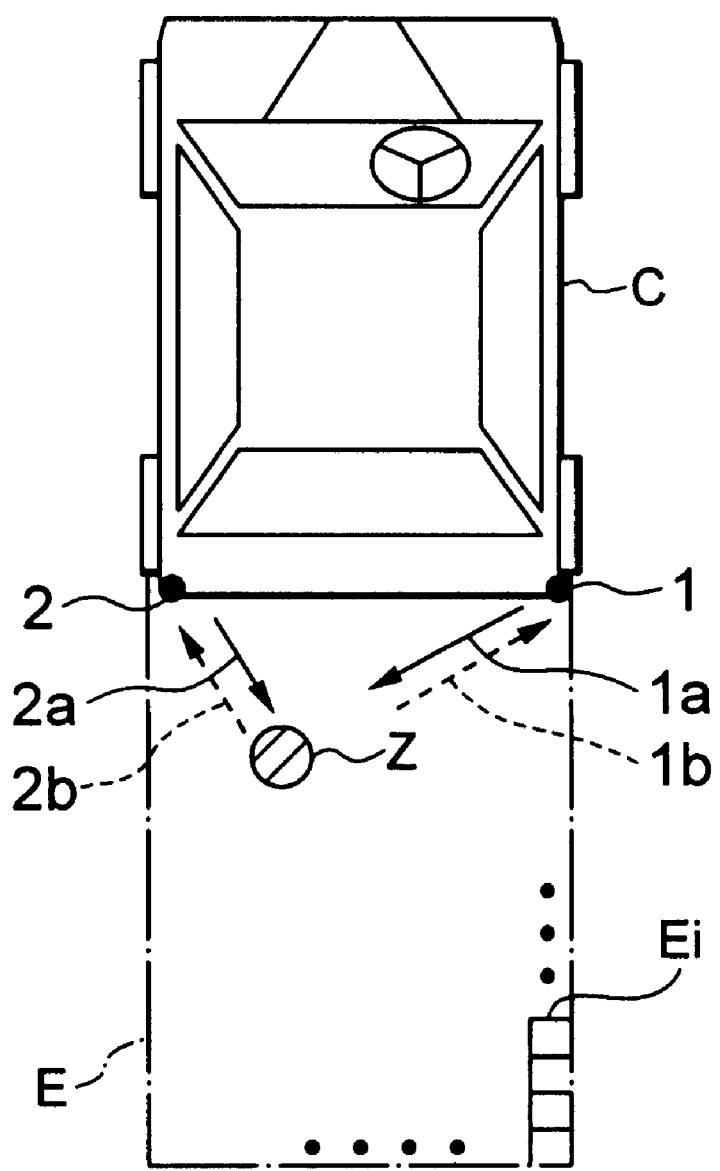
FIG. 2 is a plan view schematically illustrating the whole constitution of the embodiment 1 of the present invention.

FIG. 1 is a block diagram illustrating the embodiment 1 of the present invention, and FIG. 2 is a plan view schematically illustrating the whole constitution of the embodiment 1 of the present invention.

In FIGS. 1 and 2, the device for detecting obstacles, for use in vehicles according to the embodiment 1 of the present invention includes first and second sensor means (hereinafter simply referred to as "sensor means") 1 and 2, and a signal processing means 3 for detecting regions S where an obstacle Z exists by processing reception signals A and B from the sensor means 1 and 2.

The sensor means 1 and 2 emit beams 1a and 2a toward the surrounding of a vehicle C, and produce reception signals A and B corresponding to the intensities of the beams 1b and 2b reflected from the obstacle Z.

The signal processing means 3 includes detection region-setting means 31, 32, probability-of-presence operation means 33, 34, a probability distribution operation means 35, and an obstacle detection means 36 in order to detect the obstacle Z in the surrounding of the vehicle C based on the changes in the reception signals A and B from the sensor means 1 and 2 with the passage of time.

The detection region-setting means 31, 32 and the probability-of-presence operation means 33, 34 in the signal processing means 3 are arranged in parallel to correspond to the sensor means 1 and 2.

The detection region-setting means 31 and 32 divide the region E to be detected around the vehicle C into a plurality of matrix-like detection regions Ei (i=1 to n)(see FIG. 2), and produce reception signals Ai, Bi (i=1 to n) for each of the detection regions Ei.

Based on the reception signals Ai and Bi, the probability-of-presence operation means 33 and 34 operate probabilities of the presence of the obstacle Z in the detection regions Ei as in-the-region presence probabilities Pi, Qi (i=1 to n).

The probability distribution operation means 35 synthesizes the in-the-region presence probabilities Pi and Qi for each of the detection regions Ei to operate the distribution of presence probabilities, and operates the final in-the-region presence probabilities Ri (i=1 to n) for each of the detection regions Ei in the distribution of presence probabilities.

Based on the in-the-region presence probabilities Ri in the distribution of presence probabilities, the obstacle detection means 36 judges the regions S where the obstacle Z exists, and detects the position and size of the obstacle Z from the regions S where the obstacle Z exists.

The obstacle detection means 36 includes a threshold value-setting means for setting a judging standard (threshold value) for the regions S where the obstacle exists, and a comparator means for comparing the in-the-region presence probabilities Ri with the threshold value, and judges the detection regions Ei that exhibit the in-the-region presence probabilities larger than the threshold value to be the regions S where the obstacle exists among the in-the-region presence probabilities Ri.

In this case, the sensor means 1 and 2 comprise ultrasonic wave radars using ultrasonic waves as emitted beams 1a and 1b, and are installed at different positions (both sides) at the rear of the vehicle C.

When the ultrasonic waves are used as emitted beams 1a and 1b, the sensor means 1 and 2 may be installed at any different positions on the vehicle C.

The number of the sensor means is not limited to two but may be three or more to improve the reliability.

Next, described below with reference to FIGS. 3 to 7 is the operation of the embodiment 1 of the present invention shown in FIGS. 1 and 2.

Figure 3:
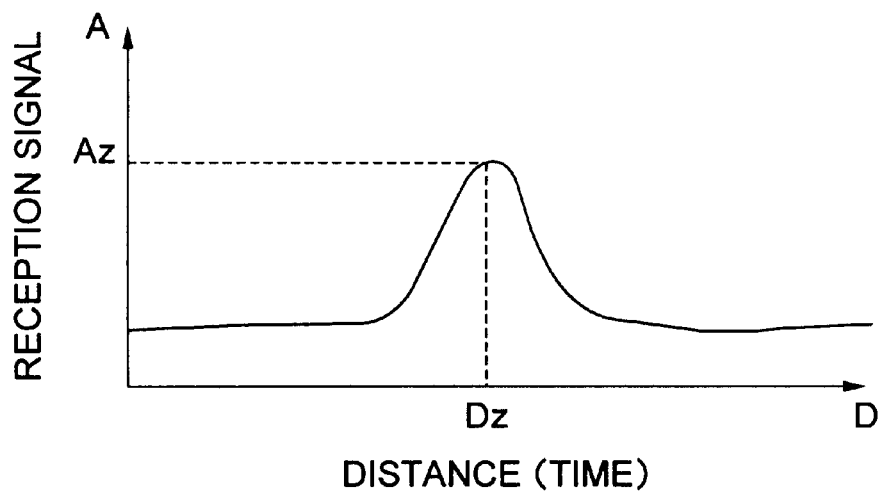
FIG. 3 is a diagram illustrating a change in the level of a reception signal A from a sensor means with the passage of time according to the embodiment 1 of the present invention.

FIG. 3 is a diagram illustrating a change in the level of the reception signal A of the sensor means 1 with the passage of time, wherein the abscissa represents the time (corresponds to the distance D).

Figure 4:
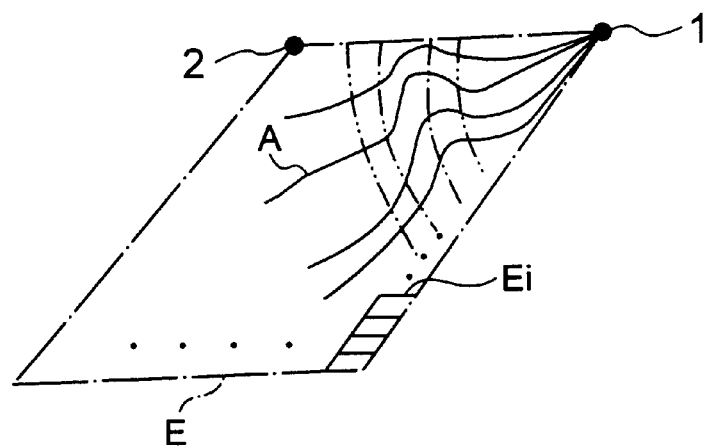
FIG. 4 is a diagram illustrating reception signals in each of the detection regions according to the embodiment 1 of the present invention.

FIG. 4 is a diagram illustrating a reception signal Ai for each of the detection regions Ei. As shown in FIG. 4, the reception signals Ai are found based on the level of the reception signals A turned about the position of the sensor means 1 (see two-dot chain lines).

Figure 5:
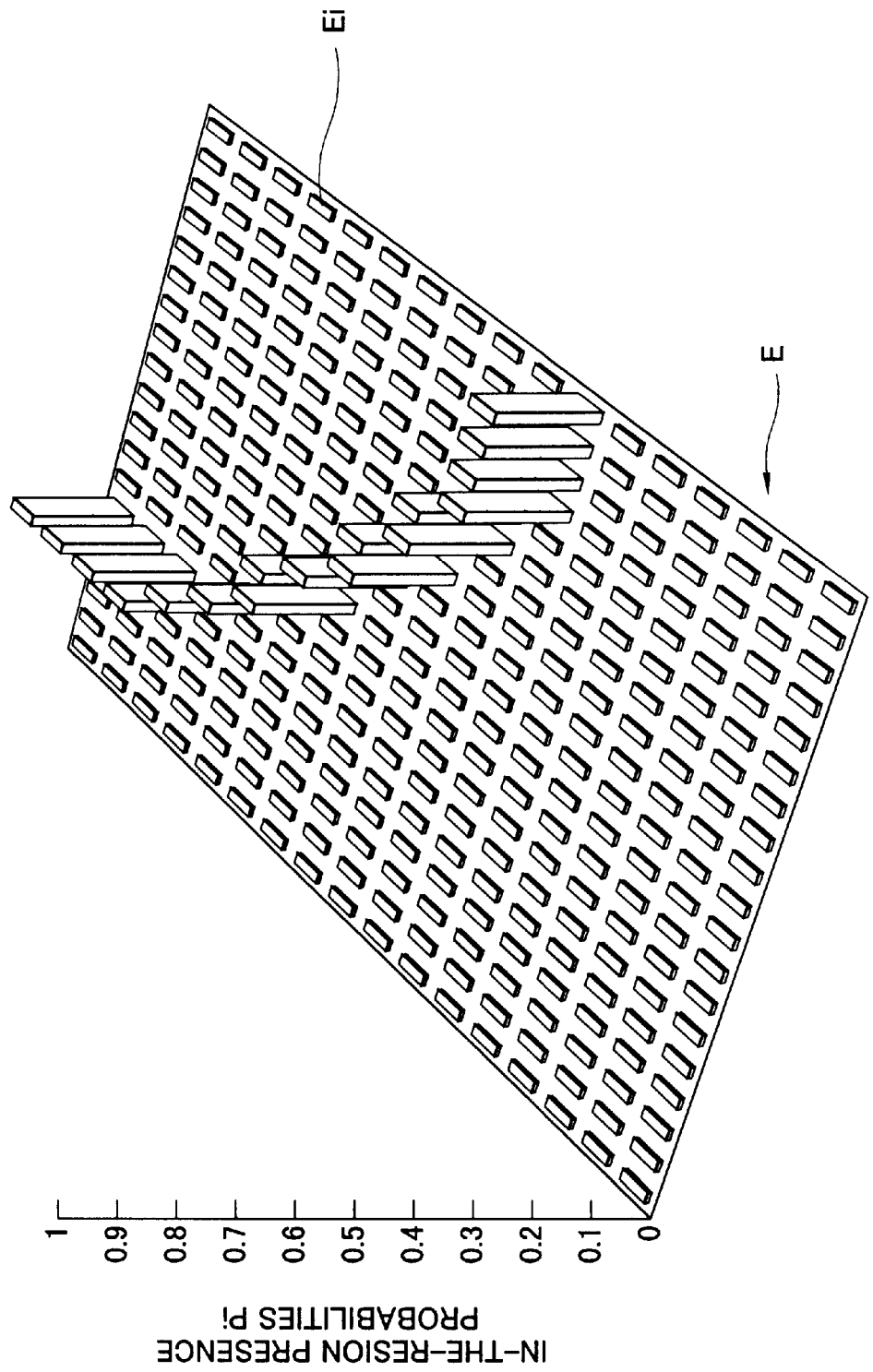
FIG. 5 is a diagram illustrating an in-the-region presence probability Pi in each of the detection regions using a first ultrasonic radar according to the embodiment 1 of the present invention.
Figure 6:
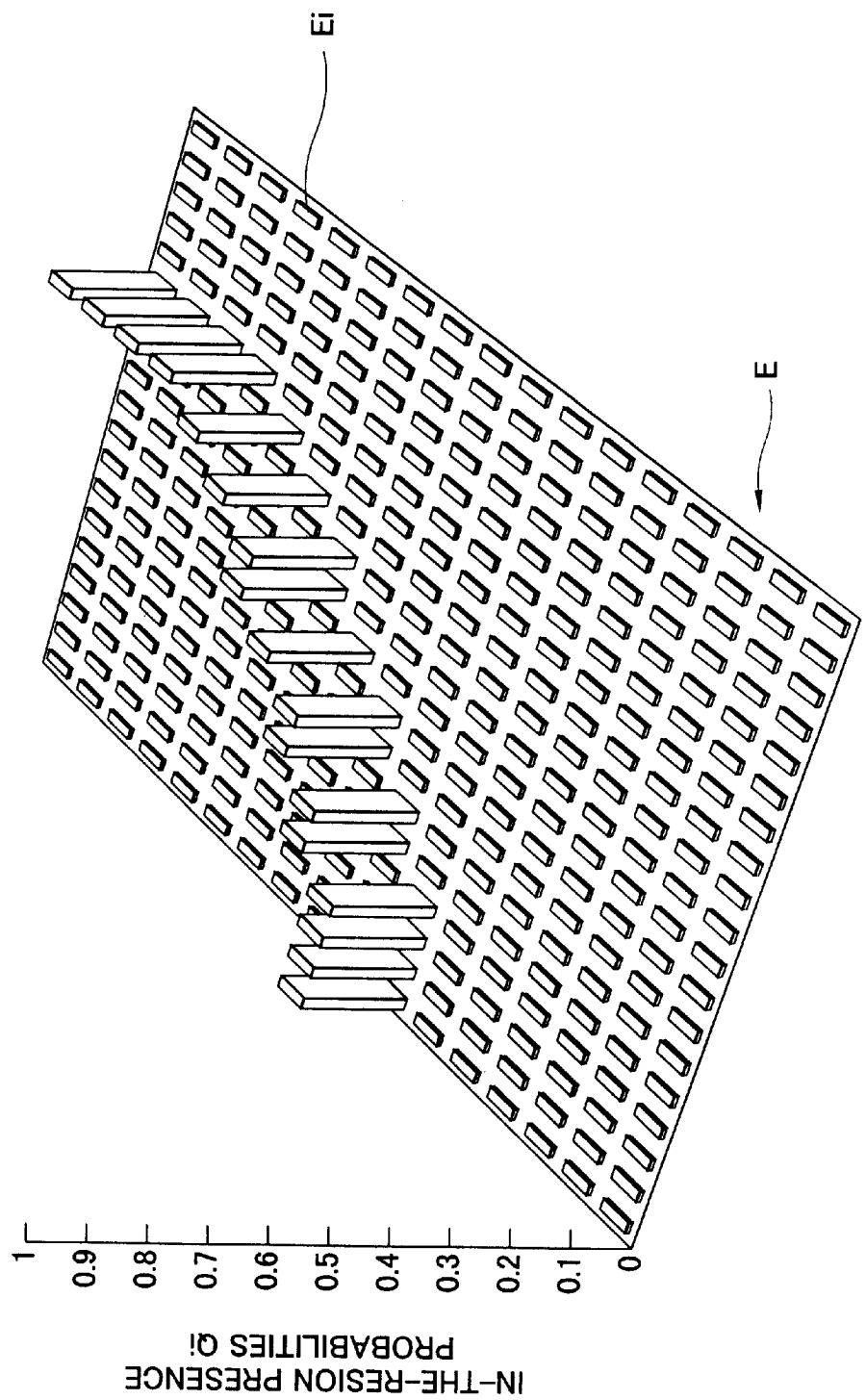
FIG. 6 is a diagram illustrating an in-the-region presence probability Qi in each of the detection regions using a second ultrasonic radar according to the embodiment 1 of the present invention.
Figure 7:
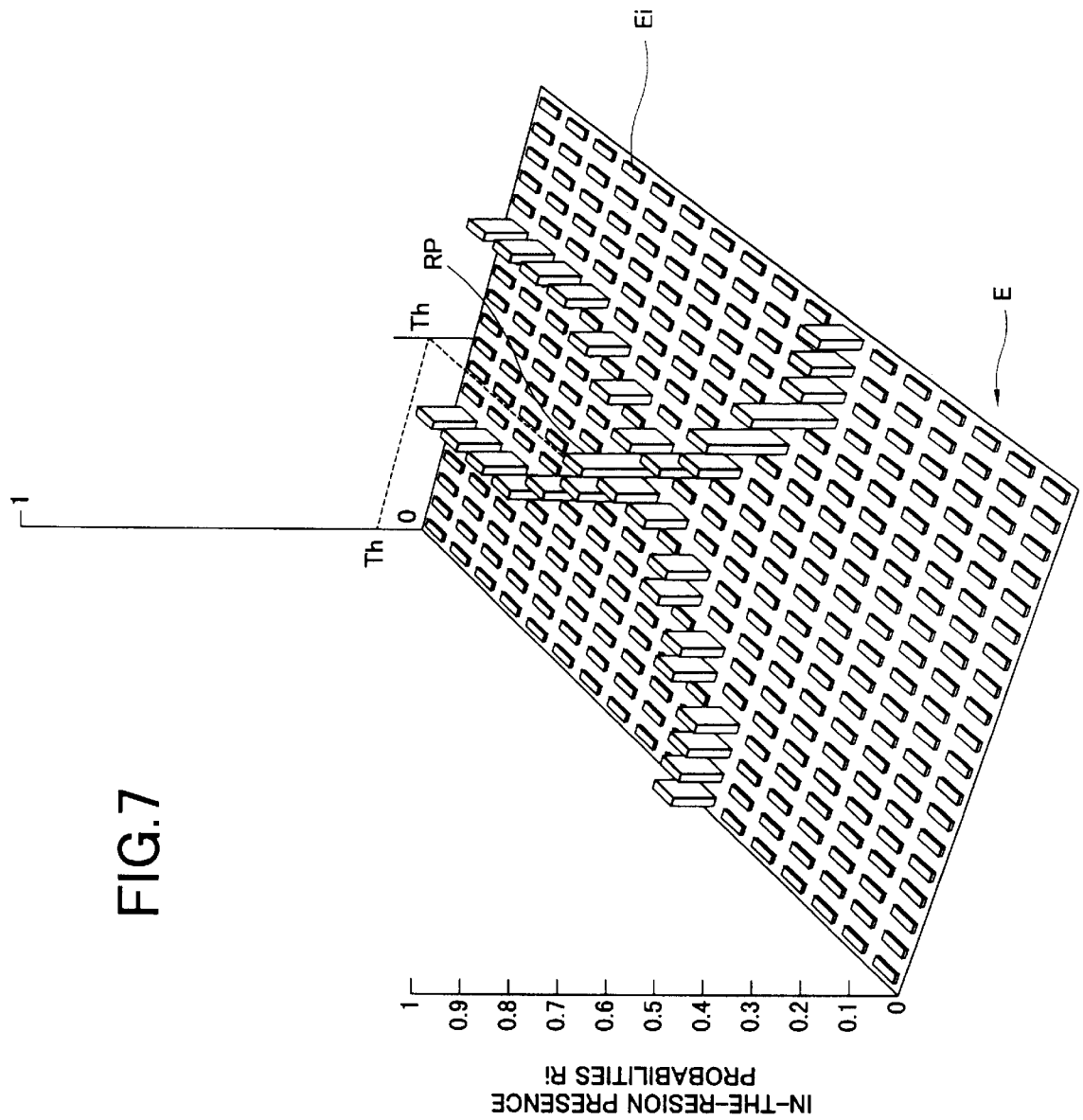
FIG. 7 is a diagram illustrating an in-the-region presence probability Ri in each of the detection regions after the synthesis according to the embodiment 1 of the present invention.

FIGS. 5 to 7 are diagram illustrating the in-the-region presence probabilities for each of the detection regions Ei, wherein FIG. 5 illustrates the in-the-region presence probabilities Pi based on the reception signals Ai from the sensor means 1, FIG. 6 illustrates the in-the-region presence probabilities Qi based on the reception signals Bi from the sensor means 2, and FIG. 7 illustrates the in-the-region presence probabilities Ri obtained by synthesizing the in-the-region presence probabilities Pi and Qi.

In FIGS. 5 to 7, the heights of blocks in the detection regions Ei represent the magnitudes of the in-the-region presence probabilities Pi, Qi and Ri. Shown here are only those in-the-region presence probabilities of not smaller than a predetermined level among the in-the-region presence probabilities Pi, Qi and Ri.

First, the sensor means 1 and 2 provided at different positions at the rear of the vehicle C as shown in FIG. 2, emits ultrasonic wave beams 1a and 2a, and produce changes in the reception levels of the reflected beams 1b and 2b with the passage of time as reception signals A and B (see, for example, FIG. 3).

In FIG. 3, for example, the time at which the reception signal A exhibits a peak value Az corresponds to a distance Dz to the obstacle Z.

When the sensor means 1 and 2 comprise ultrasonic wave radars as described above, however, resolution is low concerning the direction, and the direction cannot be specified, though reception signals A and B are obtained concerning the distance D.

As shown in FIG. 4, therefore, the detection region-setting means 31 and 32 find the reception signals Ai, Bi for each of the detection regions Ei based on the levels of the reception signals A, B turned about the positions of the sensor means 1 and 2.

Then, the probability-of-presence operation means 33 and 34 find the in-the-region presence probabilities Pi and Qi based on the reception signals Ai, Bi as shown in FIGS. 5 and 6.

The probability distribution operation means 35 synthesizes the in-the-region presence probabilities Pi and Qi, and finds the final in-the-region presence probabilities Ri in the distribution of presence probabilities as shown in FIG. 7.

Finally, the obstacle detection means 36 compares the in-the-region presence probabilities Ri (see FIG. 7) in each of the detection regions Ei with a predetermined threshold value Th, and produces the detection regions Ei that exhibit in-the-region presence probabilities Ri of not smaller than the threshold value Th as the regions S where the obstacle Z exists.

In FIG. 7, for instance, the detection regions exhibiting the in-the-region presence probabilities Rp of levels of not smaller than the threshold value Th are produced as the regions S where the obstacle exist.

As described above, the in-the-region presence probabilities Pi and Qi based on the reception signals A, B from the sensor means 1, 2 comprising ultrasonic wave radars, are synthesized, and the regions S where the obstacle exists are found by using the in-the-region presence probabilities Ri in the synthesized distribution of presence probabilities, thereby to correctly specify the position and size of the obstacle Z.

Upon detecting the position and size (distance and direction) of the obstacle Z by using the distribution of presence probabilities obtained by synthesizing the outputs of the plurality of sensor means 1, 2, furthermore, it becomes possible to detect even those obstacles that cannot be detected due to noise when only one of the sensor means 1, 2 is used alone.

Upon detecting the detection regions Ei in which the in-the-region presence probabilities Ri are not smaller than the predetermined threshold value Th as the regions S where the obstacle Z exists, furthermore, it is allowed to easily specify the position of the obstacle Z.

When the sensor means 1 and 2 are arranged on the front or side portions of the vehicle C, furthermore, the obstacle Z on the front or on the side can be detected. When the sensor means are installed in a number of three or more, it is allowed to more precisely detect the position and size of the obstacle Z.

The ultrasonic wave radars that measure only the distance to the obstacle Z are relatively cheap, and do not drive up the cost even when they are used in a plural number.

Embodiment 2.

The above-mentioned embodiment 1 has employed a plurality of sensor means 1, 2 comprising ultrasonic wave radars. It is, however, also allowable to use sensor means comprising electromagnetic radars and laser radars.

Described below with reference to the drawings is an embodiment 2 of the present invention using electromagnetic radars and laser radars.

Figure 8:
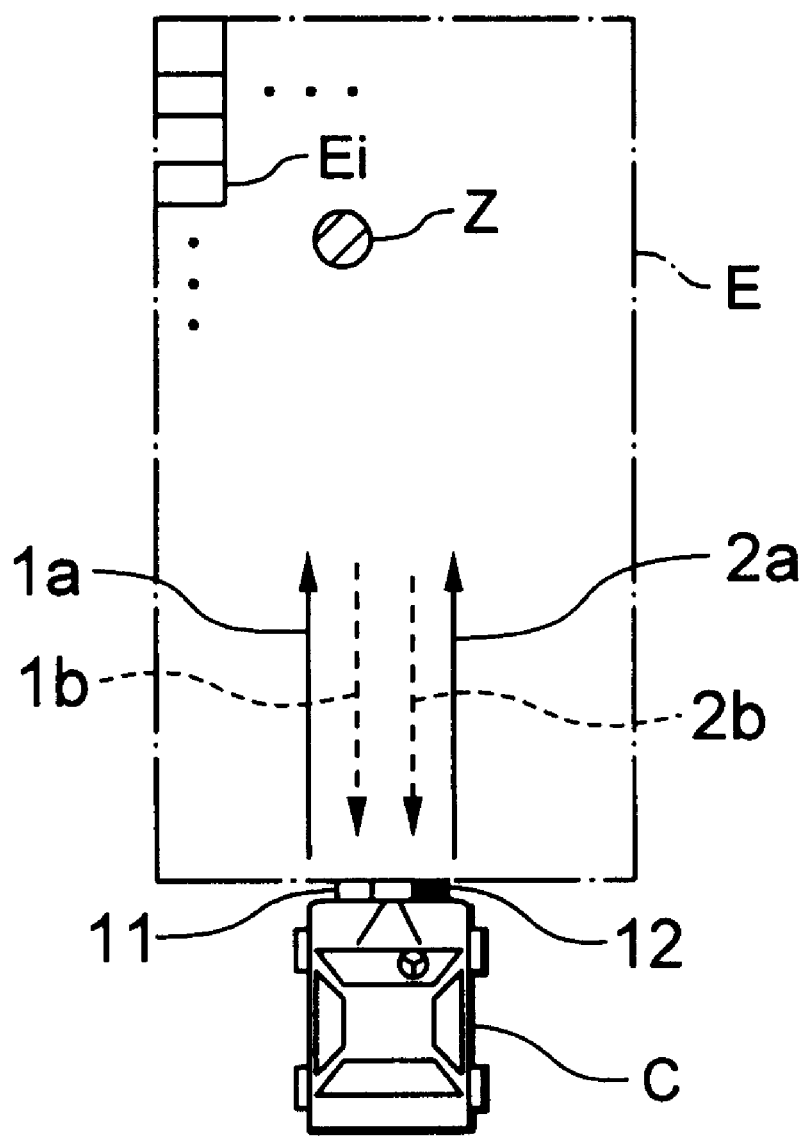
FIG. 8 is a plan view schematically illustrating the constitution of an embodiment 2 according to the present invention.

FIG. 8 is a plan view schematically illustrating the constitution of an embodiment 2 of the present invention, and wherein the same portions as those described above (see FIG. 2) are denoted by the same reference numerals but their details are not described. Though not diagramed, here, the constitution of the signal processing means 3 is as shown in FIG. 1.

In this case, the plurality of sensor means 11 and 12 are installed at front two places of the vehicle C to detect the obstacle Z in front of the vehicle C.

The sensor means 11 and 12 can be installed at any places on the vehicle C as described above.

One sensor means 11 constituted by the electromagnetic radar emits electromagnetic waves as a beam 1$a$, and the other sensor means 12 constituted by the laser radar emits a laser beam as a beam 2$a$.

The operation of the embodiment 2 of the present invention shown in FIG. 8 will now be described with reference to FIGS. 9 to 11 together with FIG. 1.

Figure 9:
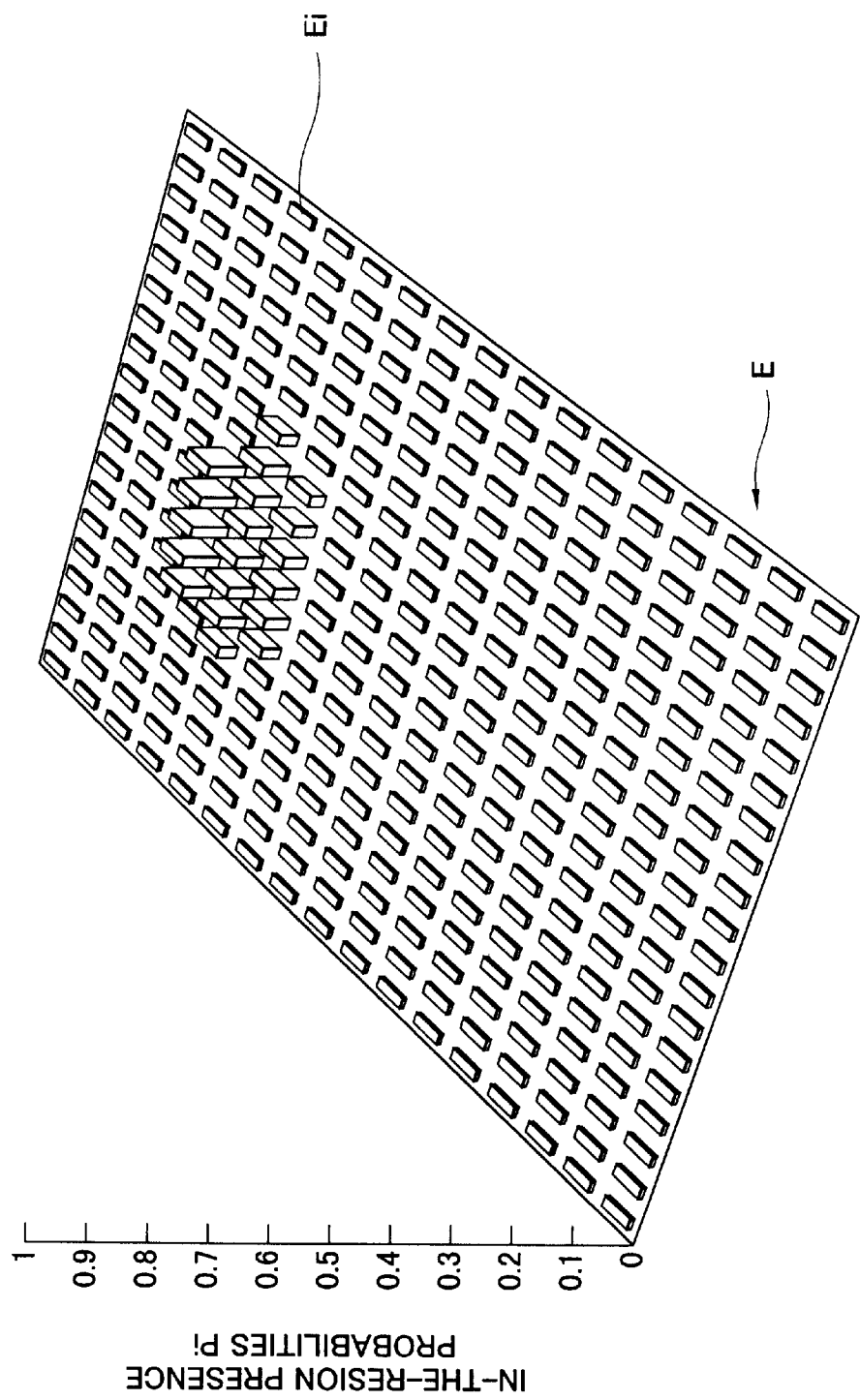
FIG. 9 is a diagram illustrating an in-the-region presence probability Pi in each of the detection regions using an electromagnetic wave radar according to the embodiment 2 of the present invention.
Figure 10:
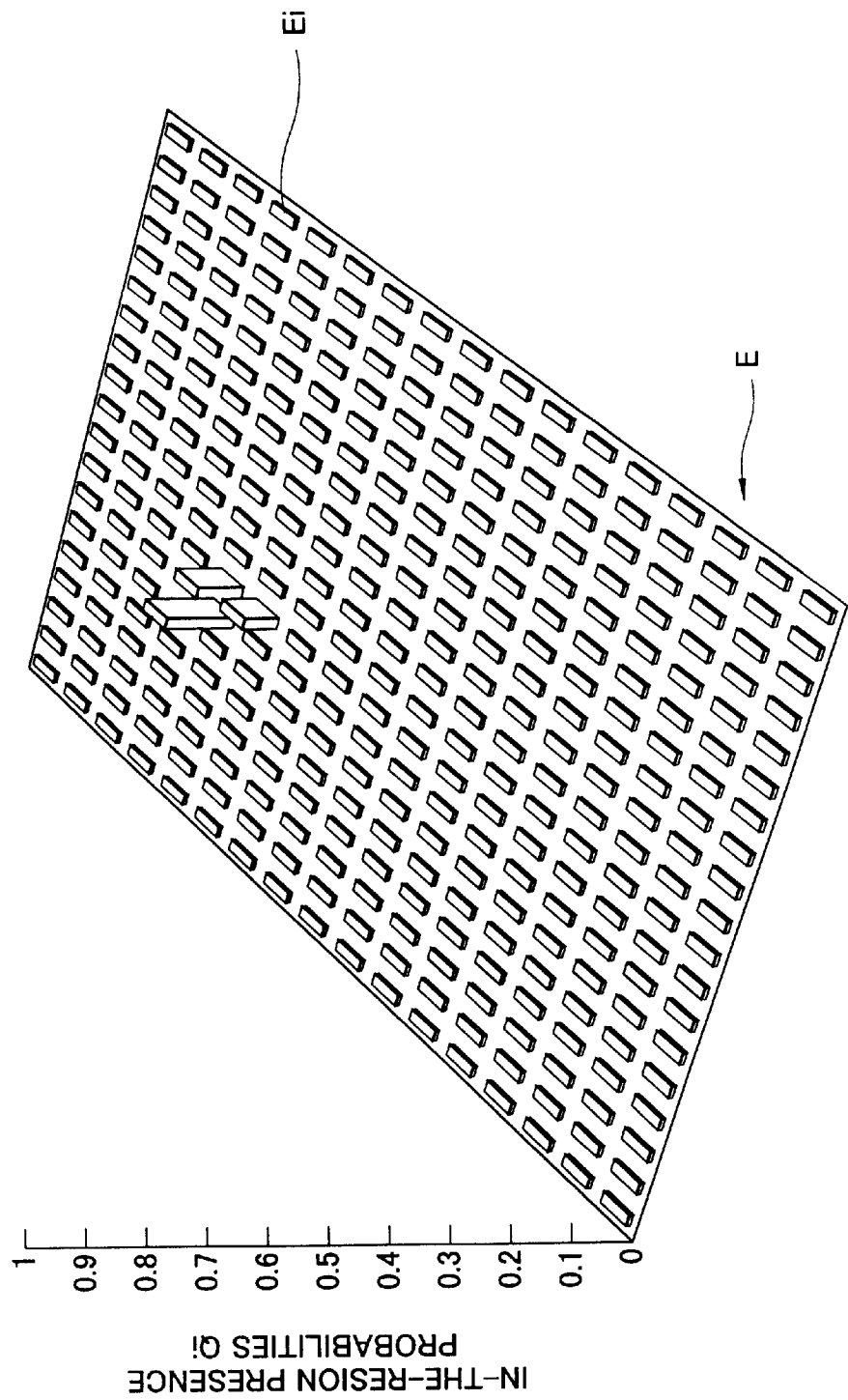
FIG. 10 is a diagram illustrating an in-the-region presence probability Qi in each of the detection regions using a laser radar according to the embodiment 2 of the present invention.
Figure 11:
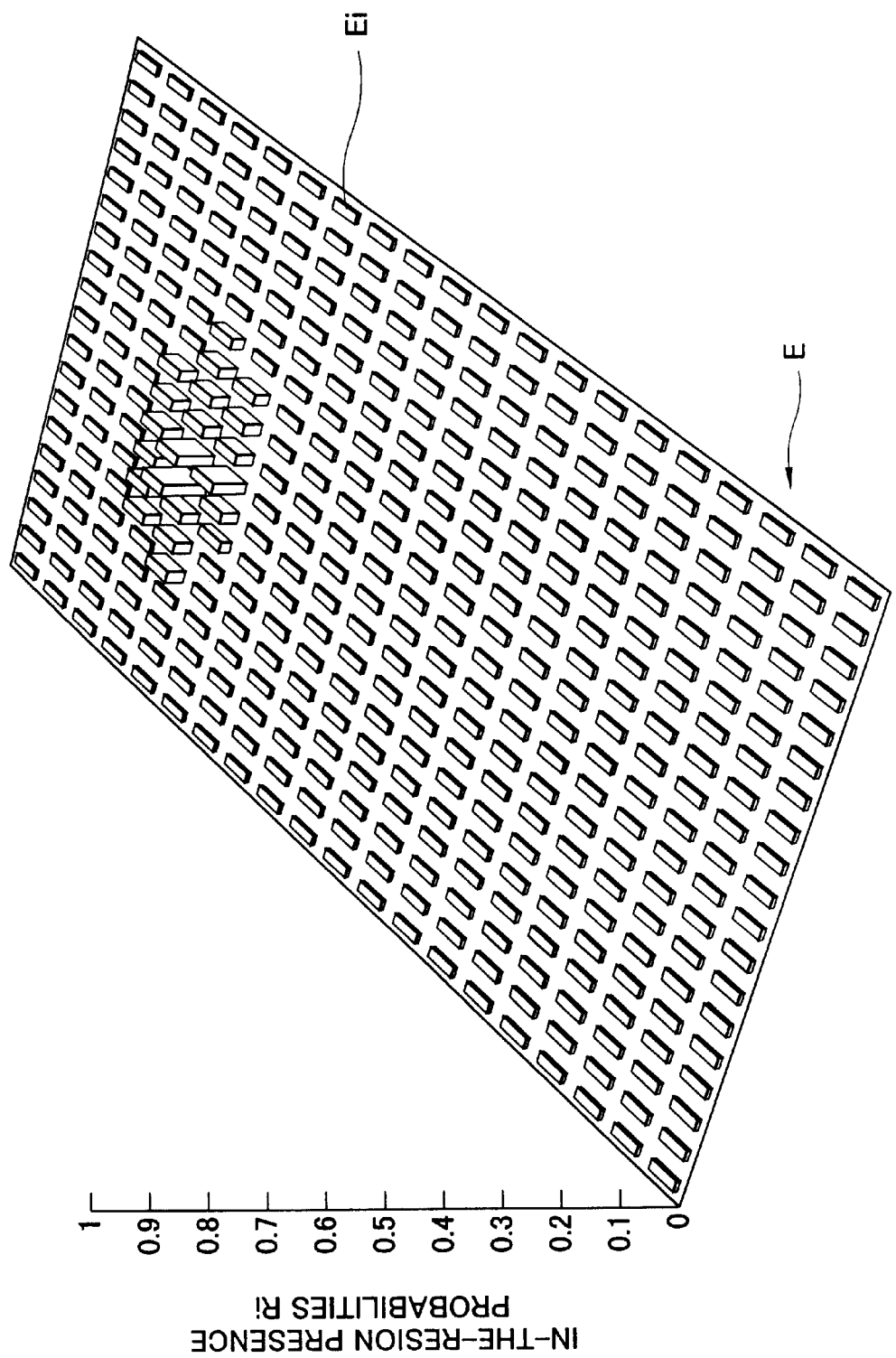
FIG. 11 is a diagram illustrating an in-the-region presence probability Ri in each of the detection regions after the synthesis according to the embodiment 2 of the present invention.

FIGS. 9 to 11 are diagrams illustrating the in-the-region presence probabilities for each of the detection regions Ei, and are corresponding to FIGS. 5 to 7 mentioned earlier.

FIG. 9 illustrates the in-the-region presence probabilities Pi based on the reception signals from the sensor means 11 (electromagnetic wave radar), FIG. 10 illustrates the in-the-region presence probabilities Qi based on the reception signals from the sensor means 12 (laser radar), and FIG. 11 illustrates the in-the-region presence probabilities Ri obtained by synthesizing the in-the-region presence probabilities Pi and Qi.

When the electromagnetic waves are used to form the beam 1$a$ by using the sensor means 11, favorable detection performance is obtained relying on the reception signals Ai though the resolution is low concerning the position of the obstacle Z, and the in-the-region presence probabilities Pi can be reliably obtained for each of the detection regions Ei as shown in FIG. 9.

When the laser beam is used to form the beam 2$a$ by using the sensor means 12, the in-the-region presence probabilities Qi are obtained based on the reception signals of high resolution limited to a narrow region in relation to the position of the obstacle Z as shown in FIG. 10, though the detection performance (detection level) is low.

The probability distribution operation means 35 in the signal processing means 3 synthesizes the in-the-region presence probabilities Pi, Qi (see FIGS. 9 and 10) based on the sensor means 11 and 12, in order to obtain the in-the-region presence probabilities Ri capable of highly precisely specifying the position of the obstacle Z.

The obstacle detection means 36 picks up the detection regions exhibiting in-the-region presence probabilities of not lower than the threshold value Th as the regions S where the obstacle Z exists among the in-the-region presence probabilities Ri.

By obtaining the regions S where th obstacle Z exists relying on the in-the-region presence probabilities Ri in the distribution of presence probabilities obtained by synthesizing the in-the-region presence probabilities based on the electromagnetic wave radar and the laser radar, it is made possible to detect the reception signals Bi that cannot be detected being buried in the noise when the laser radar only is used.

That is, the device for detecting obstacles, for use in vehicles, that features excellent direction resolution and detection performance, is realized based on the combination of an electromagnetic wave radar which exhibits excellent detection performance but low direction resolution and a laser radar which exhibits high direction resolution but slightly poor detection performance. By using the in-the-region presence probabilities Ri obtained by synthesizing the presence probabilities based on these electromagnetic wave radar and laser radar, it is made possible to detect obstacles that cannot be detected by the laser radar only.

Besides, since the presence probabilities are added relying on the electromagnetic wave radar that features favorable detection performance, the obstacle Z is detected by the sensor means (electromagnetic wave radar) having good detection performance even if the sensor means 12 (laser radar) having high precision fails to detect the obstacle Z. Thus, the obstacle Z is never get lost out of sight.

Embodiment 3.

The above-mentioned embodiment 2 has employed sensor means 11 and 12 comprising an electromagnetic wave radar and a laser radar. It is, however, also allowable to use sensor means comprising an ultrasonic wave radar and a laser radar.

Described below with reference to the drawings is an embodiment 3 of the present invention using an ultrasonic wave radar and a laser radar.

Figure 12:
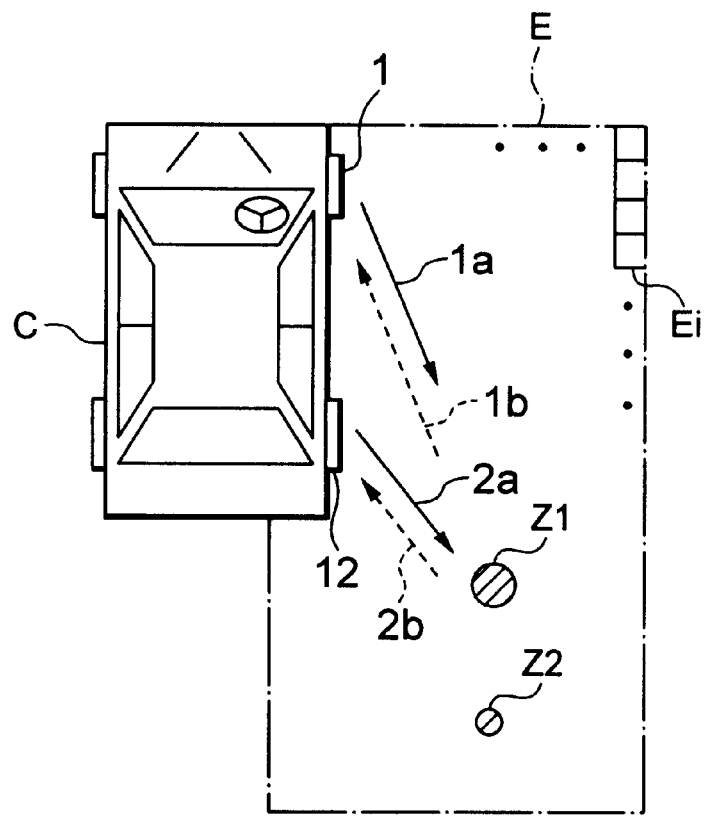
FIG. 12 is a plan view schematically illustrating the constitution of an embodiment 3 according to the present invention.

FIG. 12 is a plan view schematically illustrating the constitution of the embodiment 3 of the present invention, wherein the same portions as those mentioned above (see FIGS. 2 and 8) are denoted by the same reference numerals and their description is not repeated. The constitution of the signal processing means 3 that is not diagramed is as illustrated in FIG. 1.

In this case, a plurality of sensor means include a sensor means 1 (ultrasonic wave radar) which uses ultrasonic waves for forming a beam 1$a$ and a sensor means 12 (laser radar) which uses a laser beam for forming a beam 2$a$.

Here, there exist a plurality of obstacles Z1, Z2 in the region E that is to be detected.

The sensor means 1 and 12 are installed on a front part and a rear part on the side of the vehicle C, and detect the distances and directions of the obstacles Z1 and Z2 maintaining a high resolution.

The operation of the embodiment 3 of the present invention shown in FIG. 12 will now be described with reference to FIG. 1 together with FIGS. 13 to 18.

Figure 13:
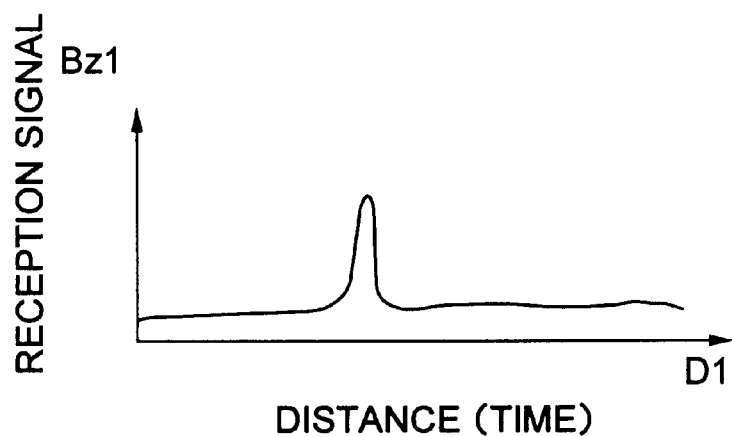
FIG. 13 is a diagram illustrating a reception signal BZ1 according to the embodiment 3 of the present invention.
Figure 14:
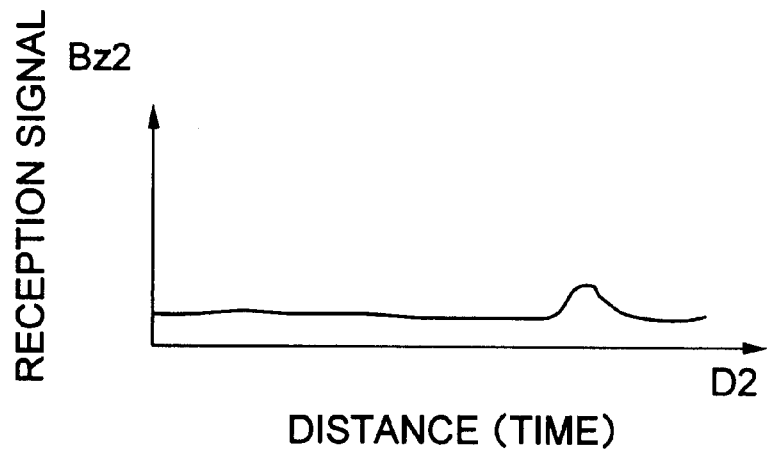
FIG. 14 is a diagram illustrating a reception signal BZ2 according to the embodiment 3 of the present invention.

FIGS. 13 and 14 are drawings illustrating reception signals of the sensor means 12 (laser radar), wherein FIG. 13 illustrates a reception signal BZ1 in the scanning direction F1 with respect to the obstacle Z1, and FIG. 14 illustrates a reception signal BZ2 in the scanning direction F2 with respect to the obstacle Z2.

In FIG. 13, the abscissa represents the time until the reception signal BZ1 is obtained in the scanning direction F1, which corresponds to a distance D1 for detecting the obstacle Z1.

In FIG. 14, similarly, the abscissa represents the time until the reception signal BZ2 is obtained in the scanning direction F2, which corresponds to a distance D2 for detecting the obstacle Z2.

Figure 15:
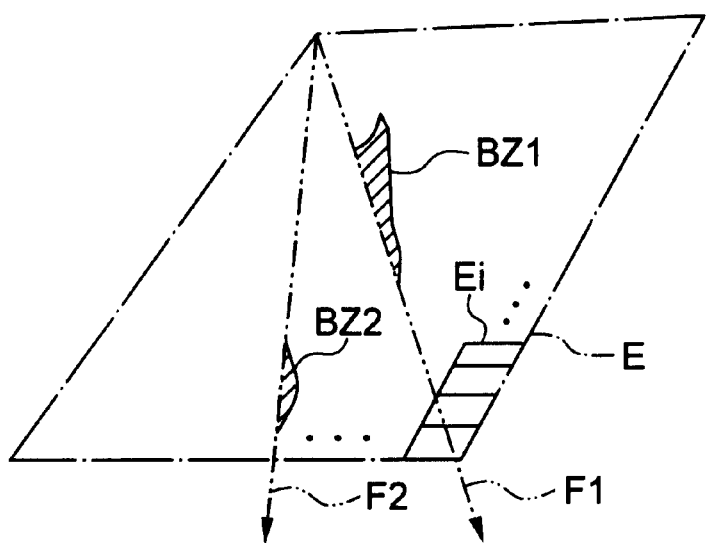
FIG. 15 is a diagram illustrating the operation for picking up a reception signal Bi in each of the detection regions according to the embodiment 3 of the present invention.

FIG. 15 is a diagram illustrating the operation for picking up reception signals Bi corresponding to the in-the-region presence probabilities Q1 for each of the detection regions Ei. The in-the-region presence probabilities Qi in the detection regions Ei are found based on the reception signals BZ1, BZ2 in the scanning directions F1, F2 (see two-dot chain lines).

Figure 16:
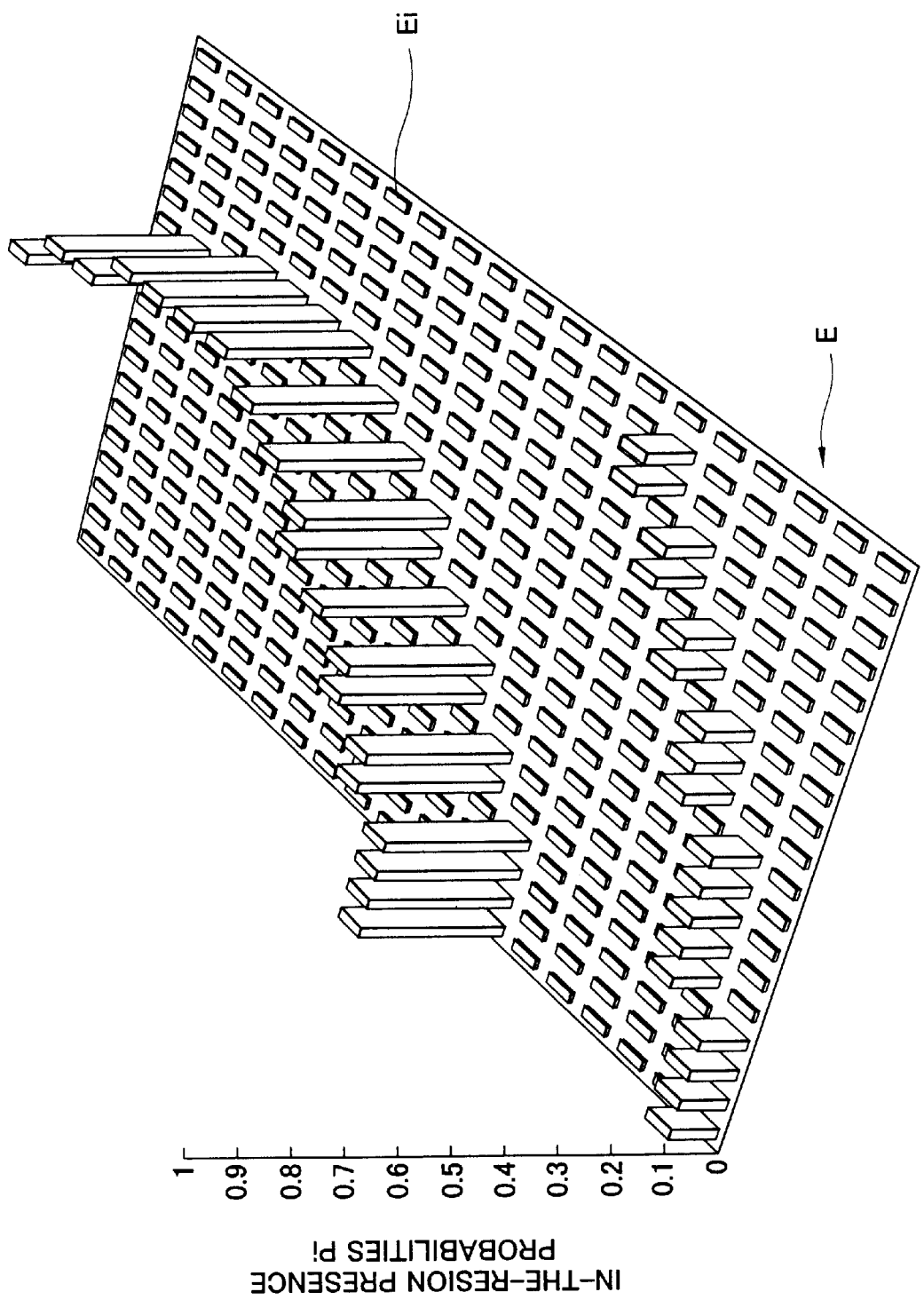
FIG. 16 is a diagram illustrating an in-the-region presence probability Pi in each of the detection regions using an ultrasonic wave radar according to the embodiment 3 of the present invention.
Figure 17:
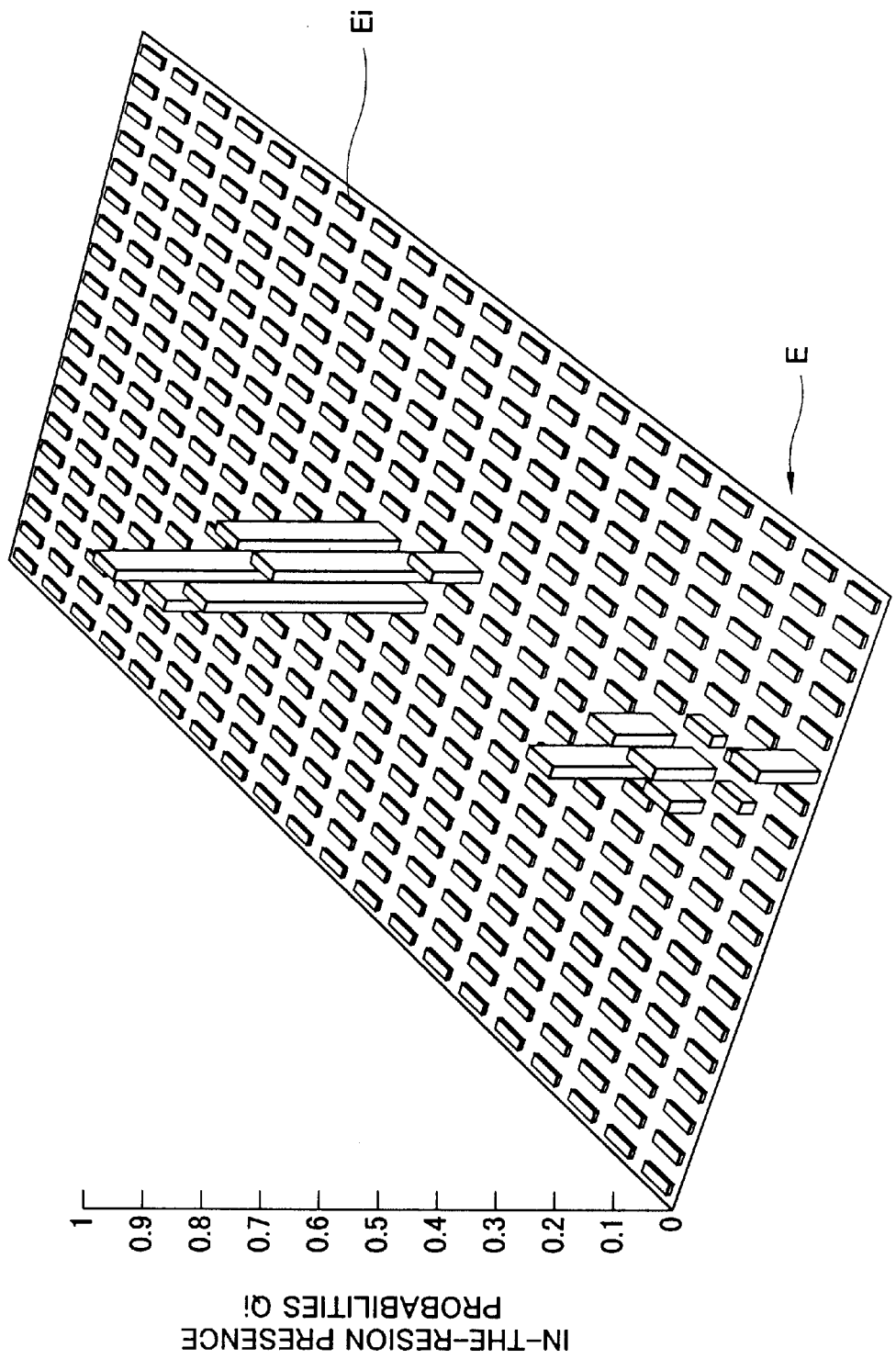
FIG. 17 is a diagram illustrating an in-the-region presence probability Qi in each of the detection regions using a laser radar according to the embodiment 3 of the present invention.
Figure 18:
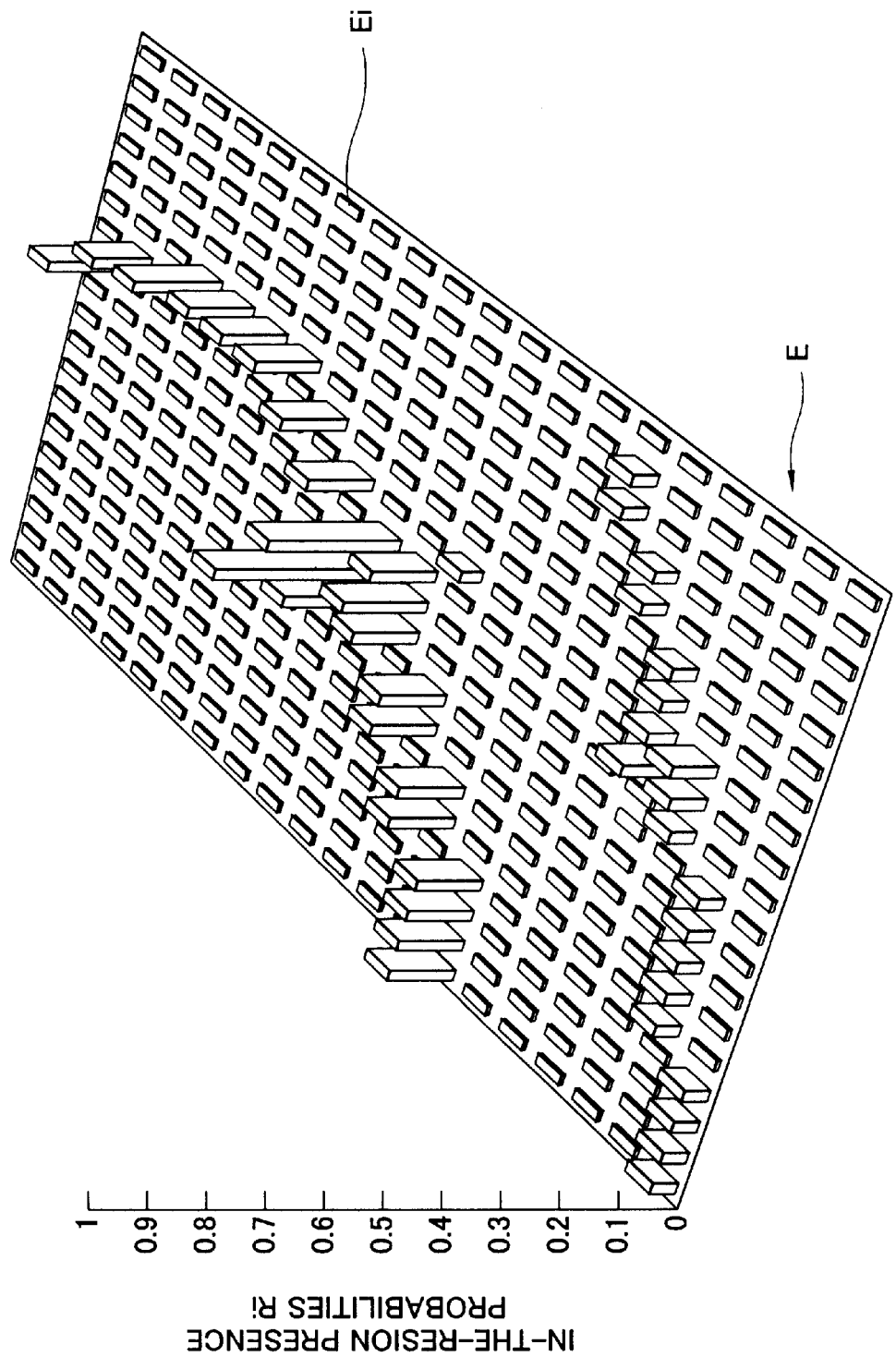
FIG. 18 is a diagram illustrating an in-the-region presence probability Ri in each of the detection regions after the synthesis according to the embodiment 3 of the present invention.

FIGS. 16 to 18 are diagrams illustrating the in-the-region presence probabilities for each of the detection regions Ei, and are corresponding to FIGS. 9 to 11.

FIG. 16 illustrates the in-the-region presence probabilities Pi based on the reception signals Ai from the sensor means 1 (ultrasonic wave radar), FIG. 17 illustrates the in-the-region presence probabilities Qi based on the reception signals Bi from the sensor means 12 (laser radar), and FIG. 18 illustrates the in-the-region presence probabilities Ri after the synthesis.

The sensor means 1 comprising the ultrasonic wave radar obtains the in-the-region presence probabilities Pi of two systems corresponding to the obstacles Z1 and Z2 as shown in FIG. 16.

The sensor means 12 comprising the laser radar obtains the in-the-region presence probabilities Qi of a high resolution representing the positions of the obstacles Z1 and Z2 as shown in FIG. 17.

The probability distribution operation means 35 in the signal processing means 3 synthesizes the in-the-region presence probabilities Pi, Qi (see FIGS. 16 and 17) based on the sensor means 1 and 12, to obtain the in-the-region presence probabilities Ri highly precisely specifying the distances and positions of the obstacles Z as shown in FIG. 18.

The obstacle detection means 36 picks up the detection regions having in-the-region presence probabilities larger than the threshold value Th as the regions S where the obstacles Z1, Z2 exist out of the in-the-region presence probabilities Ri.

By obtaining the regions S where the obstacles Z1 and Z2 exist relying on the in-the-region presence probabilities Ri obtained by synthesizing the in-the-region presence probabilities Pi, Qi based on the electromagnetic wave radar and the laser radar, it is made possible to detect the reception signals Bi that cannot be detected being buried in the noise when the laser radar only is used.

That is, the device for detecting obstacles, for use in vehicles, that features a high distance detection precision and a high direction resolution, is realized based on the combination of an ultrasonic wave distance sensor which exhibits an excellent distance detection precision but a low direction resolution and a laser radar which exhibits a poor distance detection precision in short ranges but a high direction resolution, and by using the in-the-region presence probabilities Ri obtained by synthesizing the distributions of presence probabilities based on the ultrasonic wave radar (distance sensor) and the laser radar.

Besides, even if the sensor means 12 (laser radar) of a high precision fails to detect the obstacles Z1 and Z2, the sensor means 1 (ultrasonic wave radar) having good detection performance detects the obstacles Z1 and Z2.

Embodiment 4.

Though the above-mentioned embodiments 1 to 3 did not refer to the conditions for setting the threshold value Th, it is also allowable to set the threshold value Th depending upon a maximum value of the in-the-region presence probabilities Ri in the distribution of presence probabilities.

Described below with reference to the drawings is an embodiment 4 of the present invention in which the threshold value Th is set depending upon a maximum value of the in-the-region presence probabilities Ri.

Figure 19:
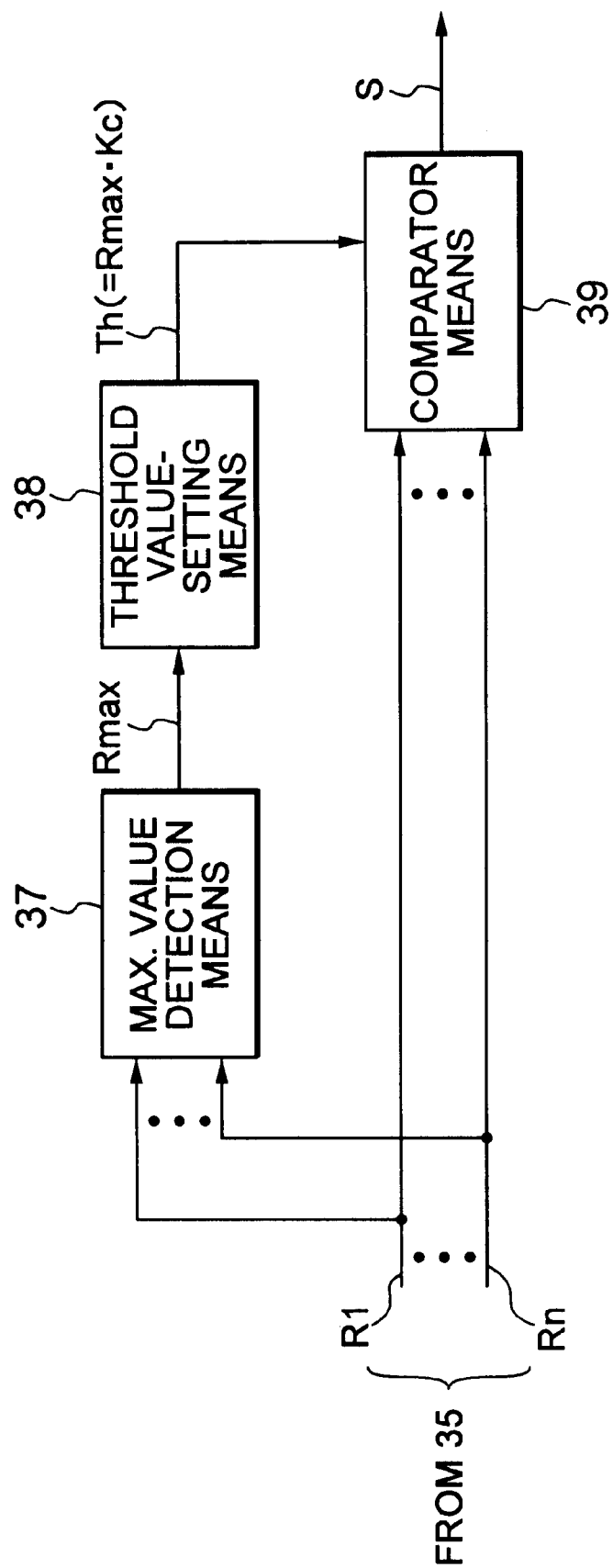
FIG. 19 is a block diagram illustrating major portions according to an embodiment 4 of the present invention.

FIG. 19 is a block diagram illustrating major portions of the embodiment 4 of the present invention, and illustrates the functional constitution of the obstacle detection means 36A in the signal processing means 3 (see FIG. 1).

In FIG. 19, the obstacle detection means 36A includes a maximum value detection means 37 for detecting a maximum value Rmax of the in-the-region presence probabilities Ri, a threshold value-setting means 38 for setting a threshold value Th from the maximum value Rmax, and a comparator means 39 for producing the regions S where the obstacle Z exists by comparing the in-the-region presence probabilities Ri with the threshold value Th.

The threshold value-setting means 38 in the obstacle detecting means 36A sets, as a threshold value Th, a value Rmax·Kc obtained by multiplying, by a correction coefficient Kc, a maximum value Rmax among the in-the-region presence probabilities Ri for each of the detection regions Ei in the distribution of presence probabilities.

The correction coefficient Kc is set to a value (e.g., about 0.5) smaller than 1. Therefore, the threshold value Th is variably set depending upon a change in the maximum value Rmax.

Therefore, even when the reception signals A and B have small levels and the in-the-region presence probabilities Ri are small, the threshold value Th is automatically shifted to a small value, making it possible to reliably detect the regions S where the obstacle exists and to highly reliably operate the position and size of the obstacle Z.

By variably setting the threshold value Th depending upon the in-the-region presence probabilities in the detection regions exhibiting a maximum value Rmax in the distribution of presence probabilities, it is allowed to prevent the detection performance from being deteriorated even when the in-the-region presence probabilities assume low values due to impaired detection ability of the sensor means.

Embodiment 5.

In the above-mentioned embodiments 1 to 4, the in-the-region presence probabilities Ri synthesized by the probability distribution operation means 35 were used for the detection of the obstacle Z. It is, however, also allowable to effect the filter processing with the passage of time in order to decrease the effect of noise.

Described below with reference to the drawings is an embodiment 5 of the present invention in which the filter processing is effected for the in-the-region presence probabilities Ri.

Figure 20:
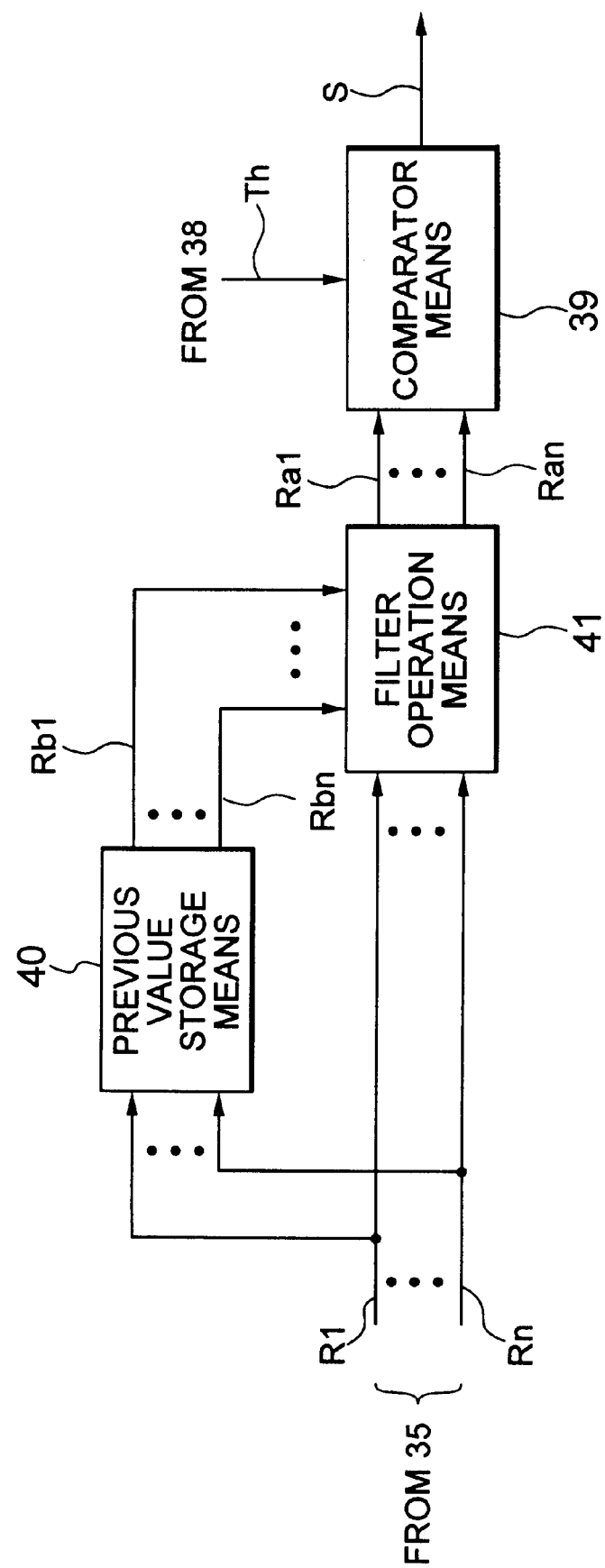
FIG. 20 is a block diagram illustrating major portions according to an embodiment 5 of the present invention.

FIG. 20 is a block diagram illustrating major portions of the embodiment 5 of the present invention, and illustrates the functional constitution of the obstacle detection means 36B in the signal processing means 3 (see FIG. 1).

In FIG. 20, the obstacle detection means 36B has a filter processing means comprising a previous value storage means 40 and a filter operation means 41 on the input side of the comparator means 39, and executes the filter processing for the in-the-region presence probabilities Ri with the passage of time.

The previous value storage means 40 stores the previous value Rbj (j=1 to n) of the in-the-region presence probability, and sends the previous value Rbj to the filter operation means 41.

The filter operation means 41 fetches the previous value Rbj and the value Rk (k=1 to n) of this time of the in-the-region presence probability Ri for each of the detection regions Ei in the distribution of presence probabilities, and operates the in-the-region presence probability Ram (m=1 to n) after the filter processing.

That is, the filter operation means 41 sets, as an in-the-region presence probability Ram, the sum of a value obtained by multiplying the value Rk of the in-the-region presence probability Ri of this time by the first filter coefficient K1 (<1) and a value obtained by multiplying the previous value Rbj of the in-the-region presence probability Ri by the second filter coefficient K2 (=1−K1).

The first and second filter coefficients K1, K2 are weighing coefficients for the value Rk of this time and for the value Rbj of the previous time.

The comparator means 39 detects the regions S where the obstacle exists by comparing the in-the-region presence probability Ram with the threshold value Th.

In finding the final in-the-region presence probability Ram in the distribution of presence probabilities as described above, the filter processing (averaging) is effected with the passage of time. Therefore, even when the in-the-region presence probability Ri of an abnormal level is operated being affected by noise, the abnormal value is suppressed by the filter operation, and the obstacle Z is prevented from being erroneously detected, and the reliability is further improved.

Embodiment 6.

In the above-mentioned embodiment 5, the filter processing was effected without taking the vehicle speed into consideration. It is, however, also allowable to correct the previous value Rbj by using a correlation coefficient W (k, j) corresponding to the vehicle speed by taking into consideration the fact that the detection region Ei for which the filter operation is to be effected shifts depending upon the vehicle speed (moving amount of the vehicle C with the passage of time).

Described below with reference to the drawings is an embodiment 6 of the present invention in which the previous value Rbj for filter operation is corrected depending on the vehicle speed.

Figure 21:
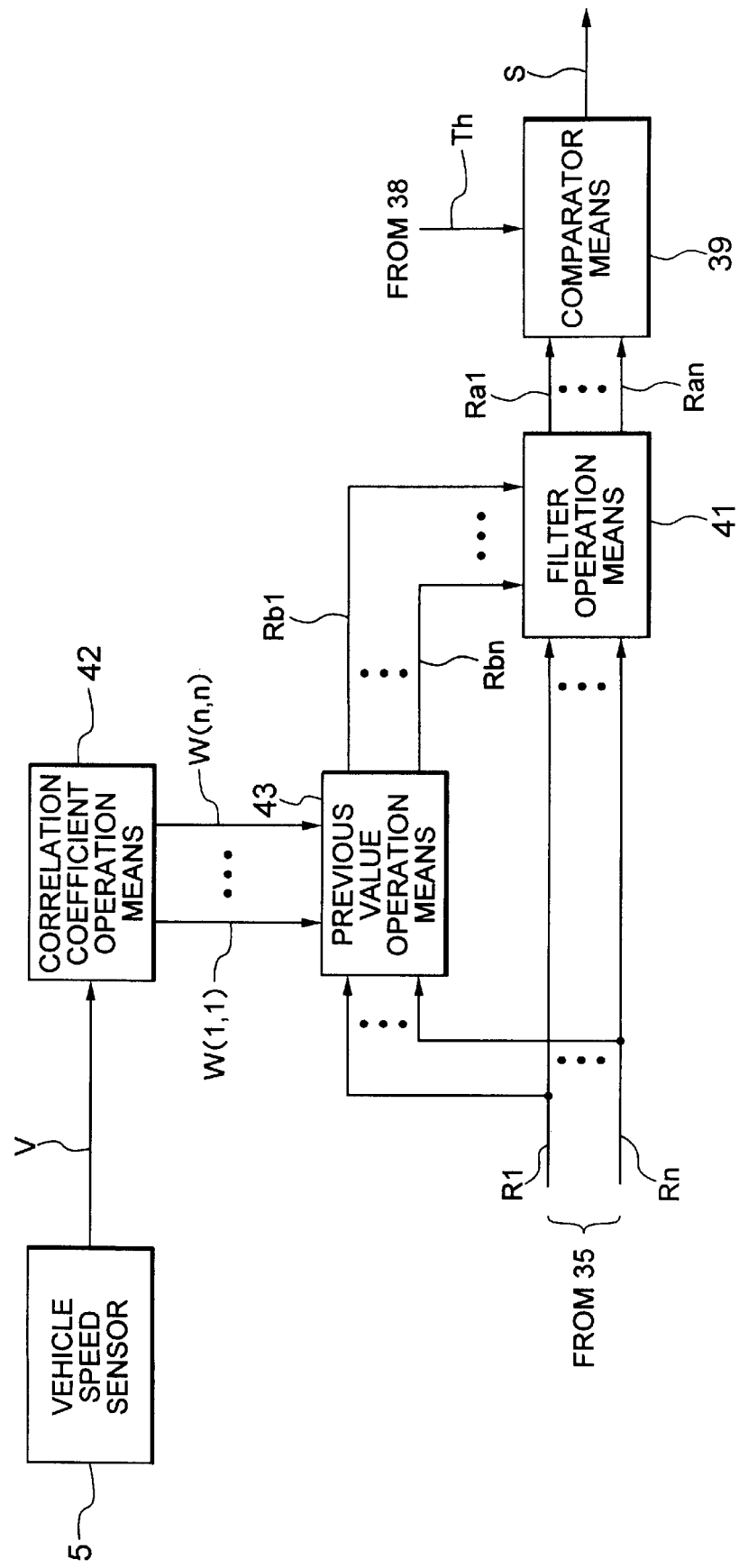
FIG. 21 is a block diagram illustrating major portions according to an embodiment 6 of the present invention.

FIG. 21 is a block diagram illustrating major portions of the embodiment 6 of the present invention, and illustrates the functional constitution of the obstacle detection means 36C in the signal processing means 3 (see FIG. 1).

In FIG. 21, the device for detecting obstacles, for use in vehicles according to the embodiment 6 of the present invention is provided with a vehicle speed sensor 5 for detecting the speed V of the vehicle C.

The filter processing means in the obstacle detection means 36C is equipped with a correlation coefficient operation means 42 and a previous value operation means 43 in addition to the filter operation means.

The correlation coefficient operation means 42 in the filter processing means operates the correlation coefficient W (k, j)(k=1 to n) of the region Ej detected in the previous time corresponding to the region Ek detected this time, for each of the detection regions depending upon the vehicle speed V.

The previous value operation means 43 works in cooperation with the correlation coefficient operation means 42, and sets the sum of values obtained by multiplying the in-the-region presence probabilities Rbj of the previous time related to all detection regions by the correlation coefficient W (k, j), as the previous value Rbj corresponding to the value Rk of the in-the-region presence probability of this time.

Therefore, the previous value Rbj input to the filter operation means 41 is set to an optimum value that corresponds to the value Rk of the in-the-region presence probability of this time so as to cancel the shifting amount caused by the vehicle speed V.

Hereinafter, the filter operation means 41 operates the in-the-region presence probability Ram maintaining a further improved reliability by using the previous value Rbj after having corrected the shifting amount of the detection region Ei caused by-the vehicle speed V. Moreover, the comparator means 39 detects the position and size of the obstacle Z maintaining high precision.

That is, when the vehicle C is traveling, the regions S in which the obstacle Z exists move depending upon the vehicle speed V. When the filter processing is simply effected for the detection regions Ei with the passage of time, the value of the in-the-region presence probabilities Ri decreases, and the mountain of the in-the-region presence probabilities Ri disperses over a wide range of detection regions Ei, causing the obstacle Z detection resolution to decrease.

Upon correcting the pick-up regions of the previous values Rbj depending upon the vehicle speed V, however, the in-the-region presence probabilities Ri are prevented from being decreased and dispersed, and a drop in the obstacle z detection resolution is avoided.

Embodiment 7.

In the above-mentioned embodiment 6, the correlation coefficient operation means 42 was used for effecting the filter operation in order to highly reliably operate the previous value Rbj that corresponds to the value Rk of this time. However, the previous value Rbj for which the filter operation is to be executed may be shifted depending simply upon the vehicle speed V within a range in which the value can be divided by the pitch of the detection region Ei.

In this case, the correlation coefficient operation means 42 is not needed, and the previous value operation means 43 fetches the vehicle speed V, shifts the detection region for which the filter operation is to be effected depending on the vehicle speed V, and operates the previous value Rbj of the in-the-region presence probability Ri corresponding to the value Rk of this time.

When the filter operation is effected for the distribution of presence probabilities with the passage of time, therefore, the pick-up region of the previous value Rbj is shifted depending upon the vehicle speed V, and the position and size of the obstacle Z are detected based upon a correct distribution of presence probabilities.

Embodiment 8.

In the above-mentioned embodiment 6, the previous value Rbj for the filter operation was corrected depending upon the vehicle speed V. It is, however, also allowable to correct the previous value Rbj by using the correlation coefficient W (k, j) depending on the yaw rate by taking into consideration the shifting amount of the detection region caused by the turning angular velocity (yaw rate) of the vehicle C.

Described below with reference to the drawings is an embodiment 8 of the present invention in which the previous value Rbj for the filter operation is corrected depending on the yaw rate.

Figure 22:
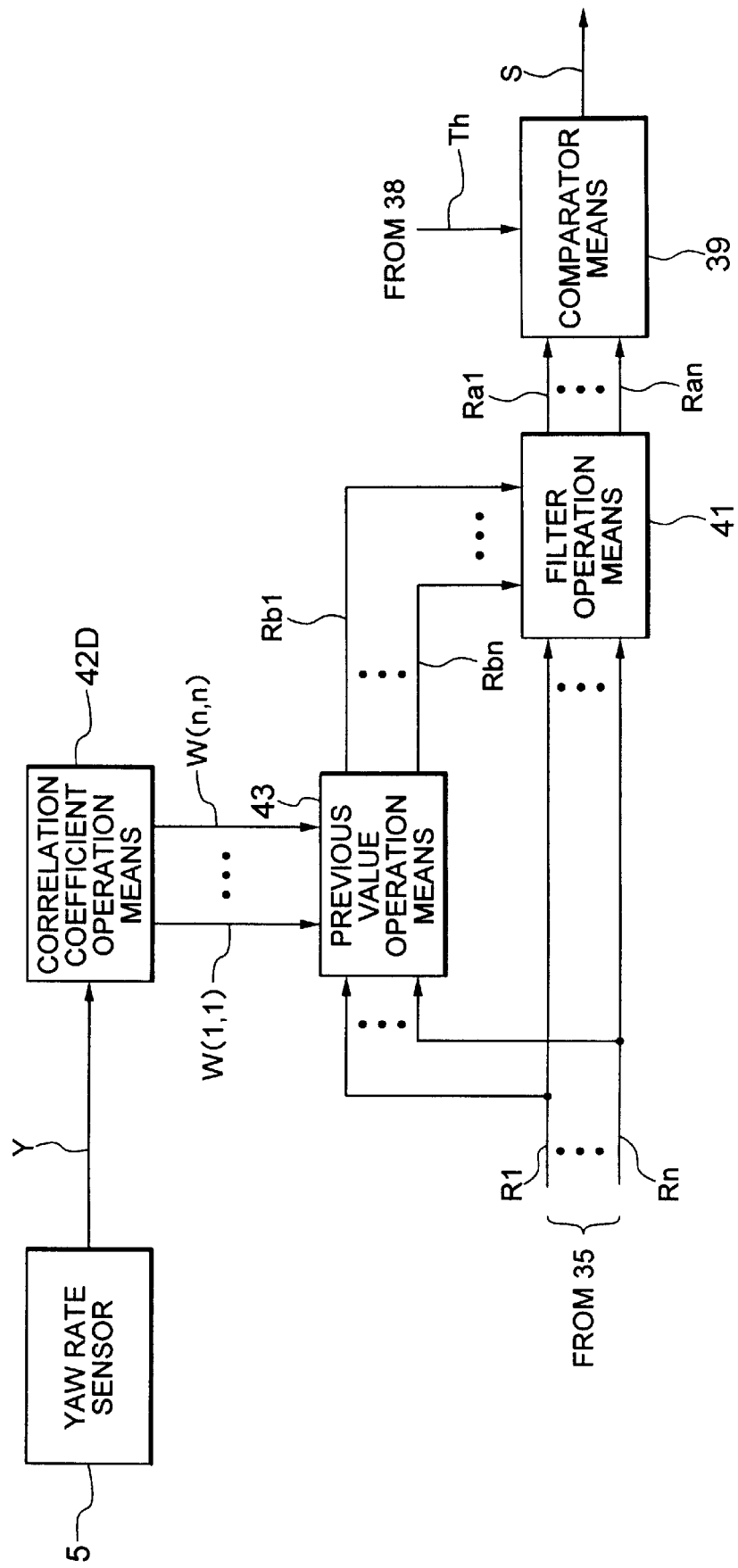
FIG. 22 is a block diagram illustrating major portions according to an embodiment 8 of the present invention.

FIG. 22 is a block diagram illustrating major portions according to the embodiment 8 of the present invention, and illustrates the functional constitution of the obstacle detection means 36D in the signal processing means 3 (see FIG. 1).

In FIG. 22, the device for detecting obstacles, for use in vehicles according to the embodiment 8 of the present invention includes a yaw rate sensor 6 for detecting the yaw rate Y of the vehicle C.

Further, the filter processing means in the obstacle detection means 36D includes a correlation coefficient operation means 42D in addition to the filter operation means 41 and the previous value operation means 43.

The correlation coefficient operation means 42D in the filter processing means operates the correlation coefficient w (k, j) of the previously detected region Ej corresponding to the region Ek detected this time depending on the yaw rate Y for each of the detection regions.

The previous value operation means 43 sets the sum of the values obtained by multiplying the in-the-region presence probabilities of the previous time related to all detection regions by the correction coefficient W (k, j), as the previous value Rbj corresponding to the value Rk of this time. The filter operation means 41 effects the filter operation by using the previous value Rbj just corresponding to the value Rk of this time, and operates the in-the-region presence probability Ram.

Therefore, the pick-up region of the previous value Rbj is corrected to an optimum value corresponding to the value Rk of this time depending on the yaw rate Y, and the obstacle Z is correctly detected by using the in-the-region presence probability Ram based on the correct filter operation.

That is, while the vehicle C is turning, the regions S where the obstacle Z exists move depending on the yaw rate Y. If the filter processing is simply effected, therefore, the obstacle Z detection resolution decreases as described above. Upon correcting the pick-up regions of the previous value Rbj depending on the Yaw rate Y, however, it is allowed to prevent a drop in the obstacle Z detection resolution.

Embodiment 9.

The above-mentioned embodiment 8 has employed the correlation coefficient operation means 42D for highly reliably operating the previous value Rbj for the filter operation. It is, however, also allowable to simply shift the previous value Rbj for which the filter operation is to be effected depending on the yaw rate Y within a range in which it can be divided by the pitch of the detection region Ei.

In this case, the correlation coefficient operation means 42D is not needed, and the previous value operation means 43 fetches the yaw rate Y, shifts the detected region for which the filter operation is to be effected depending on the yaw rate Y, and operates the previous value Rbj corresponding to the value Rk of this time of the in-the-region presence probability Ri.

When the filter operation is effected for the distribution of presence probabilities with the passage of time, the pick-up region of the previous value Rbj is shifted depending on the yaw rate Y, and the position and size of the obstacle Z can be detected based on a correct distribution of presence probabilities.

What is claimed is:

1. A device for detecting obstacles, for use in vehicles comprising:

a plurality of sensor means for emitting beams toward the surrounding of the vehicle and for producing reception signals depending upon the intensities of the reflection beams; and a signal processing means for detecting obstacles around said vehicle based upon changes in the reception signals with the passage of time;

wherein said signal processing means includes:

detection region-setting means for dividing the region around said vehicle into a plurality of matrix-like detection regions;

probability-of-presence operation means for operating the probabilities of presence of said obstacles in said detection regions as in-the-region presence probabilities;

a probability distribution operation means for operating the distribution of presence probabilities by synthesizing said in-the-region presence probabilities for each of the detection regions; and an obstacle detection means for detecting the positions and sizes of said obstacles from said regions where said obstacles exist by judging the regions where said obstacles exist based on said distribution of presence probabilities;

wherein said obstacle detection means judges detection regions exhibiting the in-the-region presence probabilities that are larger than a predetermined threshold value to be the regions where said obstacles exist among the in-the-region presence probabilities in the detection regions in said distribution of presence probabilities.

2. A device for detecting obstacles, for use in vehicles according to claim 1, wherein said sensor means includes a first sensor means and a second sensor means that use ultrasonic waves as said beams, said first sensor means and said second sensor means being installed at different positions on the vehicle.

3. A device for detecting obstacles, for use in vehicles according to claim 1, wherein said sensor means includes a first sensor means that uses electromagnetic waves as said beam and a second sensor means that uses light as said beam.

4. A device for detecting obstacles, for use in vehicles according to claim 1, wherein said sensor means includes a first sensor means that uses ultrasonic waves as said beam and a second sensor means that uses light as said beam.

5. A device for detecting obstacles, for use in vehicles according to claim 1, wherein said obstacle detection means finds a maximum value in the in-the-region presence probabilities in each of the detection regions in said distribution of presence probabilities, and sets a value obtained by multiplying said maximum value by a correction coefficient as said threshold value.

6. A device for detecting obstacles, for use in vehicles according to claim 1, wherein said obstacle detection means;

includes a filter processing means for effecting the filter processing for said in-the-region presence probabilities with the passage of time; and sets, as said in-the-region presence probability, a value obtained by adding up together:

a value obtained by multiplying a value Rk of the in-the-region presence probability of this time in each detection region Ek in the distribution of presence probabilities, by a first filter coefficient; and a value obtained by multiplying a value Rbj of the in-the-region presence probability of the previous time in each detection region Ej in the distribution of presence probabilities, by a second filter coefficient.

7. A device for detecting obstacles, for use in vehicles according to claim 6, further comprising a vehicle speed sensor for detecting the speed of said vehicle, wherein the filter processing means in said obstacle detection means includes a previous value operation means for operating the previous value Rbj of the in-the-region presence probability corresponding to the value Rk of the in-the-region presence probability of this time depending upon the vehicle speed, and effects the filter processing with the passage of time by using said previous value Rbj.

8. A device for detecting obstacles, for use in vehicles according to claim 7, wherein said previous time operation means includes a correlation coefficient operation means for operating the correlation coefficient W (k, j) of the region Ej detected in the previous time corresponding to the region Ek detected this time for each of the detection regions depending upon the vehicle speed, and sets the sum of the values obtained by multiplying the in-the-region presence probabilities of the previous time related to all detection regions by said correlation coefficient W (k, j), as the previous value Rbj corresponding to the value Rk of this time.

9. A device for detecting obstacles, for use in vehicles according to claim 6, further comprising a yaw rate sensor for detecting the yaw rate of the vehicle, wherein the filter processing means in said obstacle detection means includes a previous value operation means for operating the previous value Rbj corresponding to the value Rk of said in-the-region presence probability of this time depending upon said yaw rate, and effects the filter processing with the passage of time by using said previous value Rbj.

10. A device for detecting obstacles, for use in vehicles according to claim 9, wherein said previous value operation means includes a correlation coefficient operation means for operating the correlation coefficient W (k, j) of the region Ej detected in the previous time corresponding to the region Ek detected this time for each of the detection regions depending upon the yaw rate, and sets the sum of the values obtained by multiplying the in-the-region presence probabilities of the previous time related to all detection regions by said correlation coefficient W (k, j), as the previous value Rbj corresponding to the value Rk of this time.

* * * * *